March 4, 1958     W. J. HALL ET AL     2,825,397
FUEL CONTROL FOR GAS TURBINE ENGINES
Filed March 29, 1949     2 Sheets-Sheet 1

INVENTOR.
WALDO J. HALL
ROBERT A. PARSONS
BY
ATTORNEY

March 4, 1958  W. J. HALL ET AL  2,825,397
FUEL CONTROL FOR GAS TURBINE ENGINES
Filed March 29, 1949  2 Sheets-Sheet 2

INVENTOR.
WALDO J. HALL
ROBERT A. PARSONS
BY
K. L. Doub
ATTORNEY

United States Patent Office 2,825,397
Patented Mar. 4, 1958

2,825,397

FUEL CONTROL FOR GAS TURBINE ENGINES

Waldo J. Hall and Robert A. Parsons, South Bend, Ind., assignors to Bendix Aviation Corporation, South Bend, Ind., a corporation of Delaware Application March 29, 1949, Serial No. 84,056

10 Claims. (Cl. 158—36.3)

This invention relates to a fuel control system for gas turbine engines, and particularly for turbojet and turboprop engines of the type commonly used in aircraft. The ultimate aim in a control for such engines is to enable a pilot or operator to accelerate and decelerate to selected speeds or loads at will with maximum engine efficiency and without producing dangerously high temperatures in the burner system upon acceleration or burner failure or die-out upon deceleration. Ordinarily, the mass flow of air to the burners is a substantially linear function of engine speed and the rate of fuel feed may, therefore, be a function of or proportional to engine speed subject to correction for changes in entering air density. A fuel feed and power control device which effectively operates to maintain the rate of fuel feed within predetermined temperature limits as a function of engine speed is disclosed in the copending applications of Frank C. Mock, Serial No. 596,620, now Patent Number 2,581,276, granted January 1, 1952, and Serial No. 716,154, now Patent Number 2,689,606, granted September 21, 1954, and assigned to the assignee of the present application. With such a system, the control may be set to operate within any predetermined temperature limit upon acceleration irrespective of how suddenly the pilot increases his power lever setting. Again, upon deceleration, the control lever may be moved back to the idle stop with a minimum likelihood of burner failure.

In engines having certain characteristics, however, there is a tendency to surge and even stall at certain speeds unless a predetermined ratio of fuel-to-air is maintained, and such ratio may not always conform to an upper temperature limit throughout the acceleration range. Also, neglecting surge, an engine may have an efficiency characteristic such that to maintain a constant temperature within a certain or given limit during acceleration, it will be necessary to feed fuel at a substantially linear rate with respect to engine speed until a certain speed is attained, and then increase fuel feed above the linear rate. This results from the fact that the air flow characteristic of certain engines, notably those utilizing axial flow compressors, departs more from a linear function of engine speed as the speed increases than do other types of engines. Again, upon deceleration, to insure against burner failure in certain engines, it may prove of advantage to momentarily hold the fuel-to-air ratio at a higher value when the pilot initially throttles back than would be the case in other engines. A device which will automatically meter fuel along different temperature limits over both the acceleration range and deceleration range is disclosed in the copending application of Howard J. Williams, Serial No. 408,233 (filed February 4, 1954), which application is a continuation-in-whole of the now abandoned application Serial No. 42,302, filed August 3, 1948 (common assignee); it operates as a function of engine speed and is primarily adapted for use with the control of the above noted Mock applications. The device illustrated in the Williams application may not prove adaptable to engines having certain characteristics, and the primary object of the present invention is to provide a fuel control of this type which may be considered an improvement on or as an alternate form with respect to that disclosed in the said Williams application. More specifically, the invention has for its main object to provide improved means in a fuel feed system for a gas turbine engine whereby the rate of fuel feed to the burners is varied automatically along a single acceleration curve and a single deceleration curve at any given ambient air density, to obtain maximum efficiency in the high power range of operation and to avoid burner failure or die-out upon throttling back to the idle or low power range of operation.

The foregoing and other objects and advantages will become apparent in view of the following description taken in conjunction with the drawings, wherein:

Figure 3 is a curve chart illustrating the operation of the control.

Figure 1:
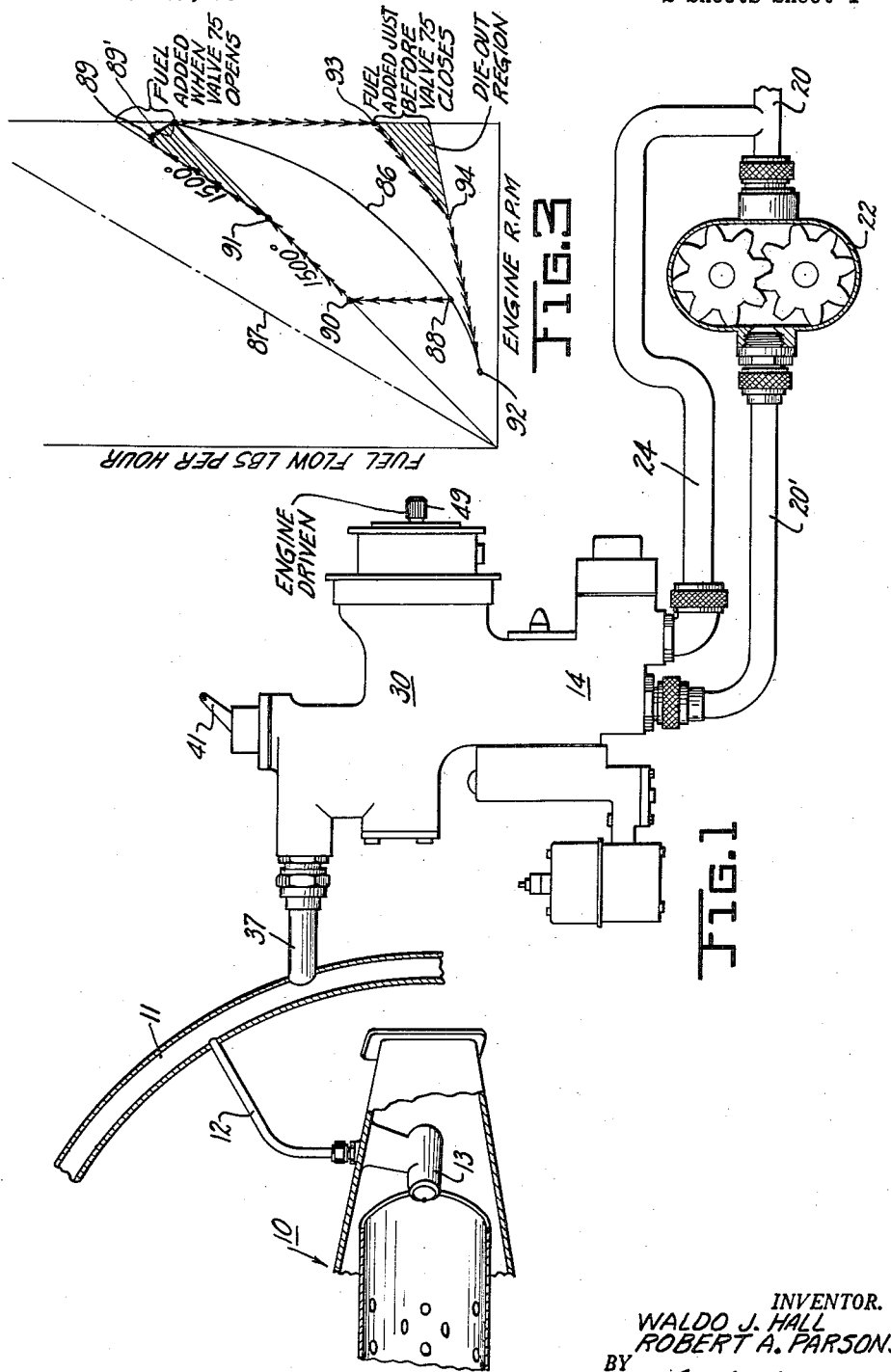
Figure 1 is a view in sectional elevation of a fuel control device for a gas turbine engine in accordance with the invention.

In Figure 1, one of the combustion chambers and associated burner of a gas turbine engine is generally indicated at 10; it is supplied with air by means of a compressor, not shown, and with fuel from a control device to be described by way of a fuel manifold 11, pipe or conduit 12 and burner nozzle or atomizer 13. The fuel is ignited upon discharge and the expanded air and products of combustion are discharged through a turbine (also not shown) which drives the compressor, the remaining unexpended energy being used either for jet thrust or for driving a propeller or for both, depending upon the particular type of engine involved.

The fuel control proper comprises a regulator section or body 14 (compare Figures 1 and 2) which is divided into a pair of chambers 15 and 16 by a metering head diaphragm 17. A regulator valve 18, provided with a series of ports 18', is connected to the diaphragm 17; it is hollow and is slidingly mounted in a casing 19. Fuel is delivered to the regulator from a suitable source, not shown, by way of conduit 20, 20' and chamber 21. A positive displacement pump 22 maintains the fuel pressure in chamber 21 (supply or $P_1$ pressure) at a predetermined value as determined by the setting of a by-pass valve 23. When this valve opens, fuel is returned to the low pressure side of the pump 22 by way of a conduit 24. The valve 23 is preferably vented to metered fuel ($P_4$) pressure by way of passageway 25 and chamber 26, a spring 27 being mounted in the latter chamber and normally urging the valve toward closed position. Thus, the supply pressure in chamber 21 is always maintained at a predetermined value above metered fuel pressure as determined by the force of spring 27.

A control section or body is generally indicated at 30; it contains a throttle or governor valve 31, which is slidably mounted in a valve body 32 having a hollow tubular extension 33, the valve being provided with one or more metering or feed restrictions 34 adapted to register with coacting restrictions 34' in the valve body. Fuel at $P_2$ pressure in chamber 15' flows into the tubular extension 33 and thence through metering restrictions 34, 34' to annular metered fuel chamber 35. From the latter chamber, the metered fuel flows across a cut-off valve, generally indicated at 36, and then by way of conduit 37 to the fuel manifold 11 of Figure 1.

The throttle valve 31 is of the all-speed governor type; it is provided with a governor spring 40 which may be selectively set or tensioned by the pilot through suitable linkage including lever 41, shaft 42, adjustable rod or link 43, arm 44, shaft 45 and lever 46. When lever 41 is turned clockwise, the spring 40 is tensioned and valve 31 is simultaneously moved in a direction to increase the area of the feed or metering restrictions 34, 34'; also, the right-hand end of the stem of valve 31 acts to reset a pair of governor weights 47 (only one of which is visible in Figure 2) mounted to rotate with an engine driven governor shaft 48 provided with a drive spline 49 adapted to have a suitable drive connection with the engine. When the selected speed is reached, the governor weights balance the governor spring and an equilibrium condition is attained, whereupon the engine will operate at a substantially constant speed for the particular setting of the pilot's control lever.

The regulator valve 18 is positioned automatically as a function of engine speed and will maintain the fuel head across the throttle valve 31 within predetermined upper and lower temperature and die-out limits irrespective of how suddenly the pilot may increase or decrease the area of the metering restrictions 34, 34'. In the example illustrated, this is accomplished by applying the thrust exerted by a pair of centrifugal weights 50 (only one of which is visible in Figure 2) to the regulator valve 18 and its coacting diaphragm 17. These weights 50 are preferably mounted to rotate with the engine driven shaft 48 along with the all-speed governor weights 47. The weights 50, however, act independently of the weights 47. Thus, while the weights 47 act on the inner end of the stem of the throttle or governor valve 31, the weights 50 act on a sliding sleeve 51 having a driving connection with the shaft 48, said sleeve in turn having an operating connection with the upper end of a lever 52, the latter being fulcrumed at 53 and at its lower end being forked and contacting a thrust bearing 54 mounted on the stem of the regulator valve 18. As the speed of the engine driven shaft 48 increases, the weights 50 move radially outward and exert a force on the regulator valve 18 in a direction tending to open the latter; this force is opposed, however, by fuel pressure acting on the diaphragm 17 in a direction tending to close said valve, the resultant differential being substantially proportional to the square of engine speed. This differential is proportional to that imposed across the throttle valve 31, and for any given position of the latter valve (assuming constant density) the velocity and hence the rate of fuel flow across the metering restrictions 34, 34' will be proportional to the square root of this differential or to engine speed directly.

An adjustable stop 55 determines the maximum open position of the regulator valve 18, while a spring 56 acting on the diaphragm 17 determines the minimum metering head at engine speeds which may be so low as to produce instability in the regulator system.

Since the supply of air to the engine burners will not only vary with engine speed, but also with changes in density due to changes in pressure and temperature and aircraft speed (ram pressure), a density compensating circuit is provided. This consists of a contoured needle 60 which controls an orifice 61 in series with one or more fixed control jets 62, communicating chamber 15 with chamber 16 across the regulator diaphragm 17. From chamber 16, fuel may flow to the metered fuel ($P_4$ pressure) chamber 35 by way of passage 63, valve chamber 64, orifice 61 and passage 65. The density needle 60 is mounted to slide in a sealed bearing 66 and at its lower end has an operating connection with an arm or lever 67 secured on the adjacent end of a shaft 68, the opposite end of said shaft having an operating connection with a density responsive spring-loaded capsule 69 by means of an arm or lever 70 and rod 71. The bellows or capsule 69 is mounted in a housing 72 vented at 73, the unit as a whole being located where it will be exposed to changes in pressure and temperature of the air flowing to the compressor.

The fuel regulator and its interrelated density compensating circuit operates as follows:

The fuel pressure differential across the regulator diaphragm 17, at a given governor setting and constant density, is equal to and balances the force set up by the centrifugal head generating weights 50; it is substantially proportional to the square of engine speed and will vary with engine speed. If at a given engine speed the throttle or governor valve 31 is repositioned, the regulator valve 18 will also be repositioned due to the fact that the regulator differential will be out of balance with the differential across the throttle valve. As the governor valve 31 opens or closes to maintain the speed selected by the setting of the governor, the regulator valve 18 opens or closes to maintain the fuel head or pressure differential across the valve 31 in accordance with the particular speed at which the engine is operating.

The density control circuit or passageway consisting of the control jets 62, chamber 16, passage 63, valve chamber 64 and passage 65 is in parallel with the main flow passage across the throttle or governor valve 31 by way of chambers 15, 15' and metering restrictions 34, 34'. All flow through the density circuit must pass through the control jets 62 and variable orifice 61 controlled by needle 60. Since at a given engine speed the differential across the regulator diaphragm remains constant, the flow through the fixed jets 62 will also remain constant, and the drop across the variable orifice 61 at constant flow will vary inversely as the square of its area, and for a given position of needle 60 (constant density) the drop across orifice 61 will be proportional to the drop across the jets 62. The sum of the drop across the orifice 61 and the drop across the jets 62 is equal to the drop across the governor or throttle valve 31, and at any fixed position of needle 60, the total drop will be substantially proportional to the square of engine speed.

Any variation in compressor inlet pressure and/or temperature will vary the position of the needle 60. Should there be a drop in entering air density, the bellows or capsule 69 will expand and move needle 60 downwardly, thereby increasing the area of orifice 61 and reducing the drop or pressure differential across said orifice. This increases the $P_2-P_3$ differential across the regulator diaphragm 17 at the then existing speed and throws the differential out of balance with the centrifugal head generating weights 50, whereupon the regulator valve 18 moves toward closed position, and the rate of fuel feed and hence engine speed is reduced to a point where the differential is again in balance with the said weights. Should there be an increase in entering air density, the foregoing sequence of operations will be reversed. It will thus be seen that the density circuit senses the pressure differential across the governor valve in order to correct the position of the regulator valve for variations in compressor inlet air pressure and temperature. Also, at any given engine speed as determined by the setting of the governor, the position of the valve 31 will remain substantially constant irrespective of changes in entering air density, but fuel flow will still vary in relation to such changes due to variation in the fuel metering head.

Figure 2:
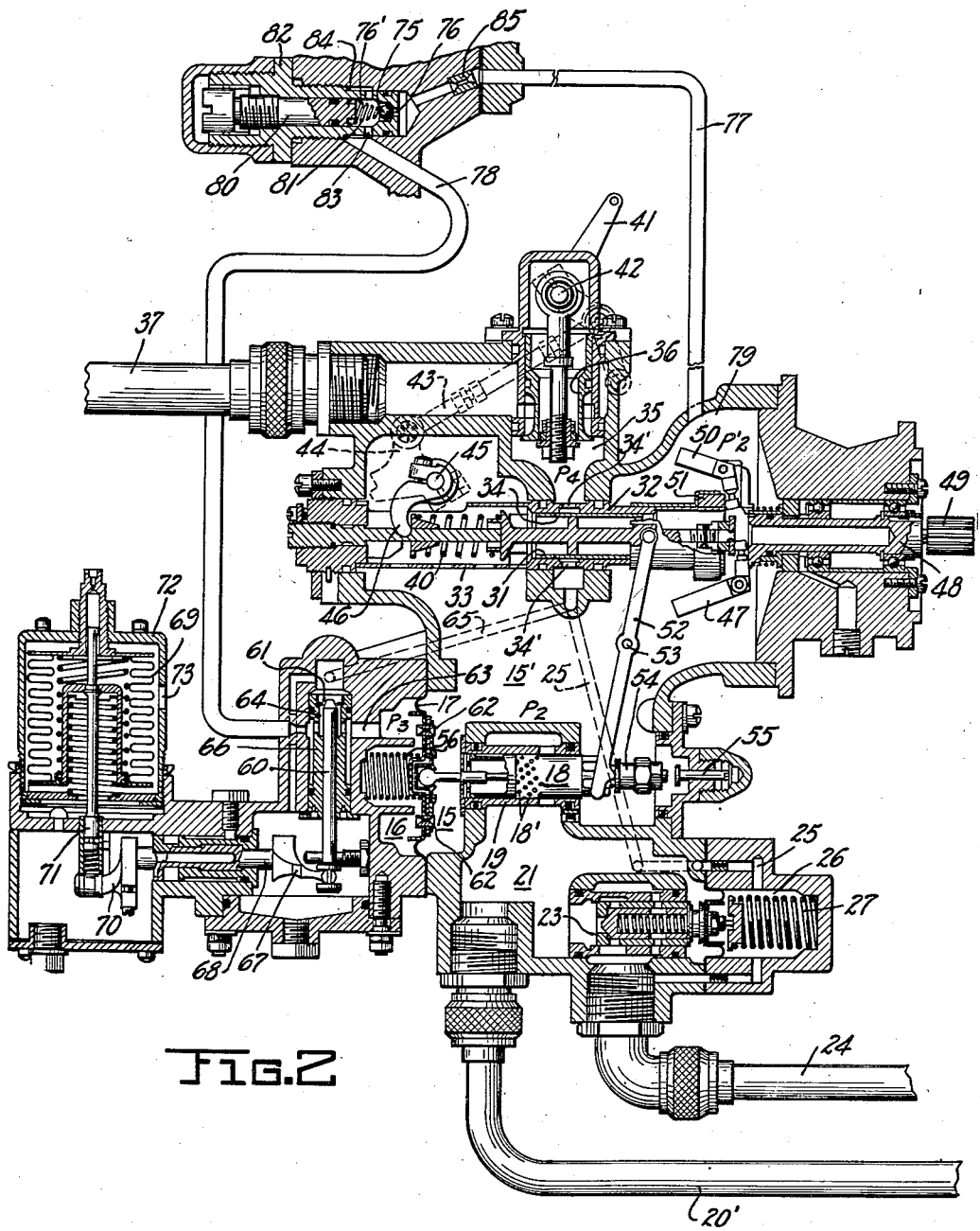
Figure 2 is a sectional schematic view of the device of Figure 1 with the fuel enrichment control valve unit removed and shown enlarged at the top of the figure to facilitate reading of the drawing.

For a more complete illustration and description of the device so far described and shown schematically in Figure 2, reference may be had to the copending applications of Frank C. Mock above noted, and particularly to Patent Number 2,689,606, which illustrates the mechanical parts more in detail.

The means whereby the rate of fuel feed to the burners is varied along a single acceleration curve and a single deceleration curve to obtain improved efficiency and avoid burner failure is shown at the top of Figure 2 in enlarged section and removed from the remaining parts of the control. It comprises a valve 75, which is shown as of the ball type but could be a contoured needle or analogous valve element, the said valve controlling an orifice 76 located in a passageway defined by a conduit 77, orifice 76, valve chamber 76', outlet orifices 83, annular chamber 84, and conduit 78, the latter terminating in the valve chamber 64 of the density compensating circuit heretofore described. The conduit 77 has its pick-up or entrance end located in the governor chamber 79 of the fuel control body 30 for a purpose to be described. The seating pressure of the valve 75 may be adjusted by means of a threaded plug 80 which at its inner end provides a retainer or seat for a spring 81. The plug is located in a valve body 82 formed with the outlet orifices 83 and an annular external recess defining the chamber 84. A calibrated restriction 85 is preferably located in the conduit 77 upstream of the valve 75 when using a valve of the ball check type, to obtain the desired metering characteristics. Such characteristic could, however, be obtained otherwise, as by using a contoured needle instead of the ball, by contouring the valve seat, by coordinating the valve spring rate with the ball check, or by other suitable metering devices.

It will be noted that the governor chamber 79 is partly closed off from the main chamber 15'. In this chamber 79 are the rotating all-speed governor weights 47 and the centrifugal head generating weights 50, which generate a pressure $P_2'$ in chamber 79 varying as a function of engine speed. The weights 47 and 50 augment or amplify the pressure in chamber 79 in a manner which is similar to the generation of pressure by a centrifugal impeller, thereby amplifying the head $P_2'-P_3$ across valve 75 as the engine accelerates. At a predetermined engine speed the augmented pressure head $P_2'-P_3$ is sufficient to overcome spring 81 and open valve 75, thereby allowing an additional supply of pressurized fuel to flow from passage 77 to passage 78 and $P_3$ pressure chamber 16. The resulting enriching action of regulator valve 18 is described in the following statement of operation.

Operation

Usually an electric starting motor is used to crank a gas turbine engine while at the same time fuel is fed to the burners and ignited, cranking being continued until the engine attains a self-sustaining speed. In tracing the flow of fuel through the control as schematically illustrated in Figure 2, it may be assumed that the engine is operating at idle speed at ground level, in which event the regulator valve 18 would be partly open under the influence of the idle spring 56 and the governor weights 50. Fuel flows to the entrance chamber 21 by way of conduit 29' at a $P_1$ pressure determined by the setting of the by-pass valve 23, then across the regulator valve 18 to chambers 15, 15' ($P_2$ pressure), and thence across the metering restriction 34 to metered fuel chamber 35 ($P_4$ pressure), from which it flows by way of conduit 37, fuel manifold 11 and fuel line 12 to the burner nozzles 13. A limited quantity of fuel will also flow through the control jets 62 and thence through the density control circuit direct to the metered fuel chamber 35 in the manner heretofore described, this flow (compensating pressure $P_3$) by-passing the throttle valve 31.

The governor or throttle valve 31 is the prime control of fuel to the engine; it is positioned by the pilot's throttle or control lever, who selects the desired engine speed. For every throttle lever position, there is a definite force set up by the governor spring 40 tending to open the governor or throttle valve 31, and for every engine speed, there is a definite thrust force set up by the governor weights 47 tending to close the said valve. When the pilot sets his throttle, the valve 31 will automatically seek a position of equilibrium, at which time the thrust force from the governor weights 47 equals the force of the spring 40 and fuel is metered at a rate tending to maintain the engine speed constant.

Movement of the governor or throttle valve 31 in a direction to increase the area of the metering restrictions 34 results in a decrease in the drop across said valve and a corresponding decrease in the differential across the regulator diaphragm 17, whereupon the regulator valve 18 moves towards open position, and fuel flow increases to a point where the fuel head across the throttle valve is in balance with the regulator. Movement of the throttle valve 31 in a direction to restrict the flow of fuel results in an increase in throttle valve drop and a corresponding increase in the differential across the regulator diaphragm 17, whereupon the regulator valve 18 moves towards closed position and fuel flow decreases to a point where fuel head is again in balance with the regulator.

During acceleration and deceleration, the metering head or differential across the governor or throttle valve 31 and hence the rate of fuel feed will also increase and decrease with changes in entering air density in the manner heretofore described.

Referring to Figure 3, the curve chart plots fuel flow against engine speed, conditions being assumed to be at ground level density. The line 86 represents the fuel feed required for steady speed. At any point along this line, the governor or throttle valve 31 is assumed to be in equilibrium. The dot and dash line 87 represents the maximum delivery of the fuel pump 22. Let it be assumed that the engine is operating at point 88 and the pilot opens the governor or throttle valve 31 sufficiently to accelerate to point 89'; then the fuel supplied during this period of acceleration will first follow the arrows from 88 to 90, this initial increase in flow represented by the vertical arrows occurring as a result of the sudden increase in the effective area of the governor valve at the then existing speed. At point 90, the rate of fuel feed has produced an operational temperature of say 1500° F. The regulator is now maintaining the fuel head across the throttle valve substantially proportional to the square of engine speed, and the rate of fuel feed follows the arrows on the maximum temperature line to point 91, where air flow departs from a linear relation to engine speed, requiring an increase in the rate of fuel feed to maintain an operational temperature of 1500° F. At point 91, however, the increase in engine speed has generated sufficient pressure in governor chamber 79 to open valve 75, and fuel flows from the latter chamber across said valve to the density control circuit upstream of variable orifice 61 and reduces the $P_2-P_3$ differential, whereupon the regulator valve 18 opens and increases the $P_2-P_4$ differential or fuel head across the throttle valve and the rate of fuel feed increases to produce the required burner temperature for maximum efficiency. The engine now accelerates to point 89, where the all-speed governor weights 47 substantially balance the setting of the governor spring. Further increase in fuel flow then ceases and the governor valve closes slightly and reaches a condition of equilibrium at 89'.

The slight departure of the fuel feed from the 1500° F. line at the upper end of the acceleration curve is due to the fixed area of the orifice 76; this could be cured by utilizing a properly contoured needle to control this orifice.

Should the pilot suddenly throttle back to the idle range, the fuel feed rate will follow the arrows from point 89' to point 92. The vertical arrows from point 89' to point 93 represent the initial reduction in fuel flow when the throttle valve is closed. However, since the engine is still running at a relatively high rate of speed, the head or $P_2'-P_4$ differential will hold valve 75 open. This differential starts to diminish with engine speed at point 93 just above the die-out region, and the valve 75 closes at point 94, whereupon the engine is operating only on idling fuel.

Although only one embodiment of the invention has been illustrated and described, certain changes in form and relative arrangement of parts may be made as dictated by requirements and practical use.

We claim:

1. In a fuel feed system for a gas turbine engine having a burner, a fuel conduit having a restriction therein, governor means for controlling the rate of fuel flow through said restriction including a centrifugal element adapted to rotate in relation to engine speed, means defining a governor chamber containing a fluid the pressure of which is augmented through rotation of said element, a fuel passage in parallel with said restriction, a fuel enrichment valve controlling flow of fuel through said passage and adapted to respond to the pressure in said governor chamber and produce an increase in the rate of fuel feed to the burner, and another valve in said passage functionable to control the head across said restriction as a function of entering air pressure and/or temperature.

2. In a fuel feed and power control system for a gas turbine engine, a fuel conduit having a restriction therein, governor means for controlling the rate of fuel flow through said restriction including at least one centrifugal element adapted to rotate in relation to engine speed, means defining a governor chamber containing fuel in which said element rotates and augments the normal fuel pressure, a fuel passage in parallel with said restriction, and a fuel enrichment valve in said passage for producing an increase in the supply of liquid fuel flowing through said restriction, said enrichment valve having an operative pressure connection with said governor chamber.

3. In a fuel feed system for a gas turbine engine, a fuel conduit having a restriction therein, governor means for controlling the rate of fuel feed through said restriction including an element adapted to rotate in relation to engine speed, means defining a governor chamber containing fuel in which said element rotates and augments the normal fuel pressure, a control circuit in parallel with said restriction, an altitude responsive member controlling flow of fuel through said circuit, a fuel enrichment passage connected to said governor chamber and to said control circuit, and a fuel enrichment valve located in said latter passage and adapted to respond to the pressure generated in said governor chamber and produce an increase in the rate of fuel feed flowing through said restriction.

4. A fuel feed system as claimed in claim 4 wherein said fuel enrichment passage communicates with said control circuit at a point upstream of said altitude responsive member.

5. In a fuel feed system for a gas turbine engine having a burner or generator to which air and liquid fuel are supplied under pressure, a fuel conduit having a feed restriction therein, a throttle valve for varying the area of said restriction to control the rate of fuel feed to the burner, a governor operatively connected to said valve, means defining a governor chamber normally containing fuel when the system is in operation, a plurality of centrifugal governor elements located in said chamber and adapted to rotate in relation to engine speed, a regulator valve for controlling the fuel head across the throttle valve as a function of engine speed, certain of said elements having an operative connection with said throttle valve and other of said elements with said regulator valve, rotation of said elements, augmenting the normal fuel pressure in said chamber, a density control circuit in parallel with said throttle valve, a fuel enrichment passage having its inlet communicating with said governor chamber and adapted to discharge into said density control circuit, and a fuel enrichment valve controlling flow of fuel through said enrichment passage, said latter valve being responsive to the pressure generated by said centrifugal elements and functioning to vary the fuel metering head across the throttle valve.

6. In a fuel feed system for a gas turbine engine having a burner or generator to which air and liquid fuel are supplied under pressure, a fuel control device comprising a fuel control section and a regulator section, a throttle valve located in said control section, a regulator valve for controlling the fuel metering head across said throttle valve located in said regulator section, governor means operatively connected to said throttle valve including at least one centrifugal weight, means defining a chamber in which said weight rotates, a control circuit including a fuel passage in the nature of a bleed off the main flow across passage in parallel with the latter, an altitude responsive valve in said control circuit, a fuel enrichment circuit including a fuel passage originating in said governor chamber and discharging into said control circuit upstream of said altitude responsive valve, and a fuel enrichment valve located in said latter passage and adapted to respond to the pressure generated in said governor chamber and vary the fuel metering head across said throttle valve.

7. In a fuel feed system for an engine, a throttle valve and an associated governor for automatically maintaining the throttle valve in a position for constant engine speed at a given governor setting, said governor including a centrifugal element rotatable in relation to engine speed, means defining a confining chamber for said element having a hydraulic fluid such as liquid fuel therein, and a fuel enrichment valve responsive to the hydraulic pressure generated by said element in said chamber for automatically increasing the rate of fuel feed as a function of engine speed.

8. In a fuel feeding system for a gas turbine engine, a fuel conduit having a restriction therein, means in said conduit for regulating the fuel pressure drop across said restriction, a passage connected in series flow relation with said regulating means and in parallel flow relation with said restriction, altitude compensating means in said passage for modifying the action of the regulating means, and a fuel enrichment valve in said passage for further modifying the action of the regulating means.

9. In a fuel feed system for a gas turbine engine, a fuel conduit having a restriction therein, means in said conduit for regulating the fuel pressure drop across said restriction, and means operatively connected to said regulating means for modifying the pressure drop across said restriction during operation of the engine, said means including altitude compensating means in series flow relation with said regulating means and fuel-air ratio enriching means operative during an acceleration of the engine to cause an abrupt increase in the flow of fuel through said restriction.

10. In a fuel feed system for a gas turbine engine having a burner, a fuel conduit having a feed restriction therein, a throttle valve for varying the area of said restriction to control the rate of fuel feed to the burner, a governor operatively connected to said throttle valve for varying fuel flow as an inverse function of engine speed and including an element which is adapted to rotate in relation to engine speed, chamber means related to said element in such a manner that the rotation of said element produces an augmented pressure in said chamber, and a device responsive to said augmented pressure for producing an increase in the rate of fuel feed to the burner at a predetermined engine speed during an acceleration of the engine.

References Cited in the file of this patent

UNITED STATES PATENTS

| | | |
|---|---|---|
| 2,414,322 | Mock | Jan. 14, 1947 |
| 2,581,276 | Mock | Jan. 1, 1952 |
| 2,644,513 | Mock | July 7, 1953 |
| 2,664,152 | Davies | Dec. 29, 1953 |
| 2,689,606 | Mock | Sept. 21, 1954 |

FOREIGN PATENTS

| | | |
|---|---|---|
| 934,814 | France | Jan. 19, 1948 |